United States Patent
Kim et al.

(10) Patent No.: US 6,771,458 B2
(45) Date of Patent: Aug. 3, 2004

(54) MEDIA ENCLOSURES PROVIDING REDUCED AIR GAP AROUND DISK DRIVE MEDIA SURFACES OF A DISK DRIVE

(75) Inventors: Seong Hoon Kim, Cupertino, CA (US); Tae Yeon Hwang, San Jose, CA (US); Tho Pham, Milpitas, CA (US)

(73) Assignee: Samsung Electronics Co., LTD, Suwon (KR)

( * ) Notice: Subject to any disclaimer, the term of this patent is extended or adjusted under 35 U.S.C. 154(b) by 0 days.

(21) Appl. No.: 10/100,960

(22) Filed: Mar. 18, 2002

(65) Prior Publication Data

US 2003/0174437 A1 Sep. 18, 2003

(51) Int. Cl.[7] ............................................. G11B 33/14
(52) U.S. Cl. ................................................. 360/97.02
(58) Field of Search ........................... 360/97.2, 98.01; 369/13.24; 181/207

(56) References Cited

U.S. PATENT DOCUMENTS

| 4,583,213 | A | | 4/1986 | Bracken et al. ............. 369/261 |
|---|---|---|---|---|
| 5,189,574 | A | | 2/1993 | Imamura et al. .......... 360/234.2 |
| 5,757,582 | A | * | 5/1998 | White et al. ............. 360/98.01 |
| 6,014,287 | A | | 1/2000 | Ehlers et al. ............... 360/224 |
| 6,266,298 | B1 | * | 7/2001 | Tsai ......................... 369/13.24 |
| 6,360,843 | B1 | * | 3/2002 | Kim et al. ................... 181/207 |
| 2002/0135933 | A1 | * | 9/2002 | Harrison et al. .......... 360/97.02 |
| 2003/0076621 | A1 | * | 4/2003 | Kim ......................... 360/97.02 |
| 2003/0099060 | A1 | * | 5/2003 | Kang et al. .............. 360/97.02 |

* cited by examiner

*Primary Examiner*—Tianjie Chen
(74) *Attorney, Agent, or Firm*—Gregory Smith & Associates; Jeffrey P. Aiello; Earle Jennings

(57) ABSTRACT

The inventors have discovered that aerodynamic forces contribute to disk fluttering. If the flow of air about these disk surfaces is unstable, the resulting aerodynamic forces can mechanically excite the disk surfaces, causing fluttering. The invention includes media enclosures constraining such aerodynamic effects, methods of making disk drives with these enclosures, the disk drives. This includes disk drives of at most 13 millimeters in height.

24 Claims, 7 Drawing Sheets

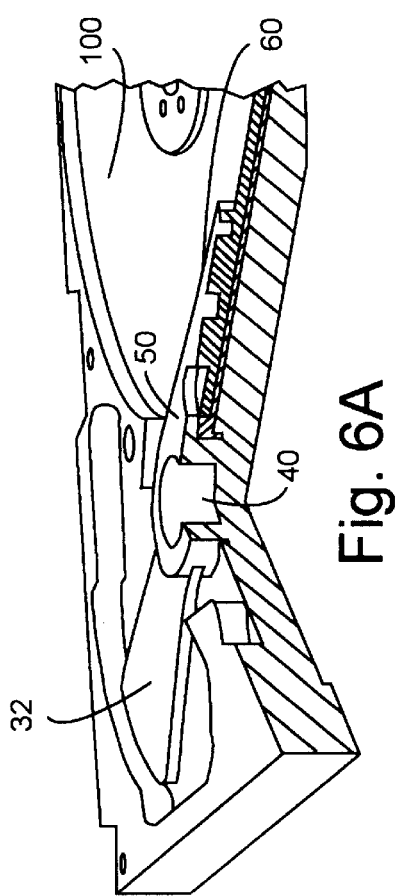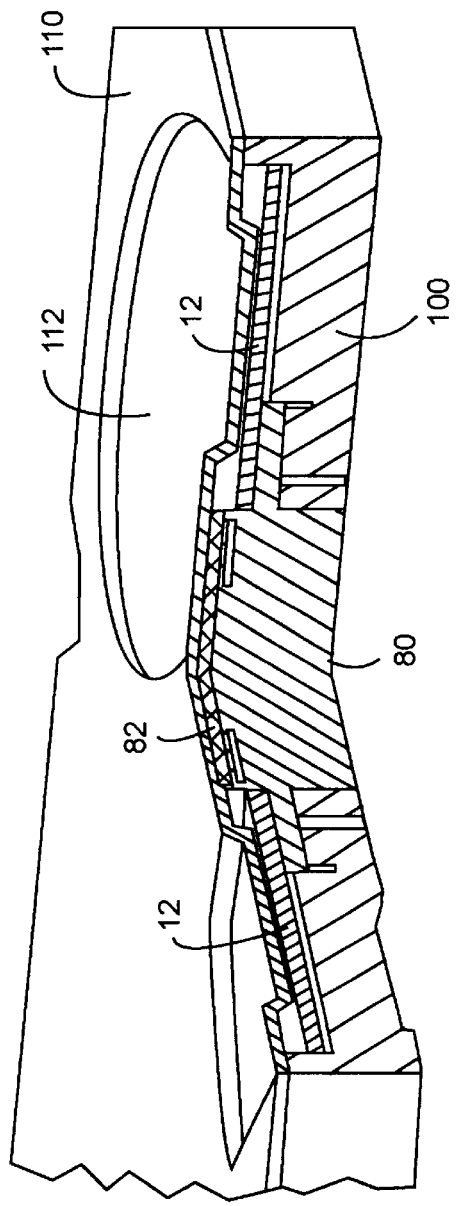

MEDIA ENCLOSURES PROVIDING REDUCED AIR GAP AROUND DISK DRIVE MEDIA SURFACES OF A DISK DRIVE

TECHNICAL FIELD

This invention relates to enclosures in a disk drive providing a reduced air gap around disk drive media surfaces within the enclosure.

BACKGROUND ART

Disk drives are an important data storage technology, which include several crucial components. Disk drive read-write heads directly communicate with a disk surface containing the data storage medium over a track on the disk surface. This invention involves improving the ability to position at least one read-write head over the track on the disk surface.

FIG. 1A illustrates a typical prior art high capacity disk drive 10 including actuator arm 30 with voice coil 32, actuator axis 40, suspension or head arms 50–58 with slider/head unit 60 placed among the disks 12.

FIG. 1B illustrates a typical prior art high capacity disk drive 10 with actuator 20 including actuator arm 30 with voice coil 32, actuator axis 40, head arms 50–56 and slider/head units 60–66 with all but one disk 12 removed as well as including spindle motor 80.

Since the 1980's, high capacity disk drives 10 have used voice coil actuators 20–66 to position their read-write heads over specific tracks. The heads are mounted on head sliders 60–66, which float a small distance off the disk drive surface when in operation. Often there is one head per head slider for a given disk drive surface. There are usually multiple heads in a single disk drive, but for economic reasons, usually only one voice coil actuator.

Voice coil actuators are further composed of a fixed magnet actuator 20 interacting with a time varying electromagnetic field induced by voice coil 32 to provide a lever action via actuator axis 40. The lever action acts to move head arms 50–56 positioning head slider units 60–66 over specific tracks with speed and accuracy. Actuator arms 30 are often considered to include voice coil 32, actuator axis 40, head arms 50–56 and head sliders 60–66. Note that actuator arms 30 may have as few as a single head arm 50. Note also that a single head arm 52 may connect with two head sliders 62 and 64.

Today, read-write head positioning errors are a significant point of failure and performance degradation. These positioning errors are caused in part by disk fluttering. Some fluttering problems for disks can be attributed to instabilities in the motor turning the disk, which are being addressed by the motor manufacturers.

The disk drive industry faces some significant challenges. As either recording densities or spindle speed increases, both head positioning accuracy and head-flying stability must increase. Note that competitiveness in the disk drive industry requires both requires both increased recording density and increased spindle speeds. Note that head-flying is the motion of the read-write head over the disk surface, which flies a short distance off that surface.

In order to achieve an even higher track density essential for meeting the higher recording density requirements, the allowable position error of the heads relative to registered data tracks is required to be less than 0.05 $\mu$m for the next few years.

New ways to improve head positioning and stabilize head-flying are needed to meet these challenges, as well as improve the reliability of existing disk drives.

SUMMARY OF THE INVENTION

The inventors have found that the above needs can be achieved through further reduction of disk fluttering and flow-induced vibration around actuator arms. High-speed rotation results in large amplitude vibration of the head-slider suspension and the arms. Thus the reduction of flow-induced vibration is essential to current and future disk drive to protect head-positioning failures.

Aerodynamics has been an area of active and continuing research since at least the nineteenth century. Prandtl defined boundary layers early in the twentieth century. The boundary layer concept was directly applicable to fluid flows involving air, water and other low viscosity fluids. The boundary layer is a fluid region near a surface with essentially no relative velocity with regards to that surface. This region is caused by the effect of friction between the solid surface and the fluid. The depth of this region is roughly proportional to the square root of the viscosity divided by the angular velocity of the surface.

The inventors have discovered that aerodynamic forces contribute to disk fluttering. If the air flow around these disk surfaces is unstable, the resulting aerodynamic forces can mechanically excite the disk surfaces, causing fluttering.

These aerodynamic forces act upon disk surfaces with respect to the air cavity in which the disk surfaces rotate. A rotating disk surface will tend to create a rotating boundary layer of air. This boundary layer will tend to rotate in parallel to the motion of the disk surface. The stationary surface of the disk drive cavity facing the disk surface will also tend to generate a boundary layer. The inventors discovered that when there is enough distance between the stationary surface and the disk surface for more than the boundary layer of the rotating disk surface, there is a back flow created against the direction of flow from the rotating disk surface.

The inventors have discovered that a significant reduction in disk surface mechanical fluttering results from reducing the air gap between stationary surfaces facing the disk surface to about the boundary layer thickness. The inventors have found that when the air gaps are approximately the boundary layer thickness, there is improved head positioning. When the air gaps are smaller fractions of the boundary layer thickness, there are further improvements in head positioning. These improvements are summarized for an operational rotating velocity of 5400 Revolutions Per Minute (RPM) in FIG. 3. Similar improvements are expected for other operating rotational velocities such as 7200 RPM, 10,000 RPM and over 14,000 RPM.

The invention includes not only the mechanical enclosures housing disk surfaces within a disk drive, but also the manufacturing methods, and the resulting disk drives. The disk drives may further be at most 13 millimeters in height.

These and other advantages of the present invention will become apparent upon reading the following detailed descriptions and studying the various figures of the drawings.

BRIEF DESCRIPTION OF THE DRAWINGS

FIG. 6A illustrates a perspective view of voice coil actuator components 32, 40, 50, and 60, assembled with respect to the disk drive base 110 as illustrated in FIGS. 4 and 5; and FIG. 6B illustrates a perspective view the assembled disk base 100, spindle motor 80, disk 12, disk clamp 82, and disk drive cover 110, of FIGS. 4 and 5.

DETAILED DESCRIPTION OF THE INVENTION

Figure 1A:
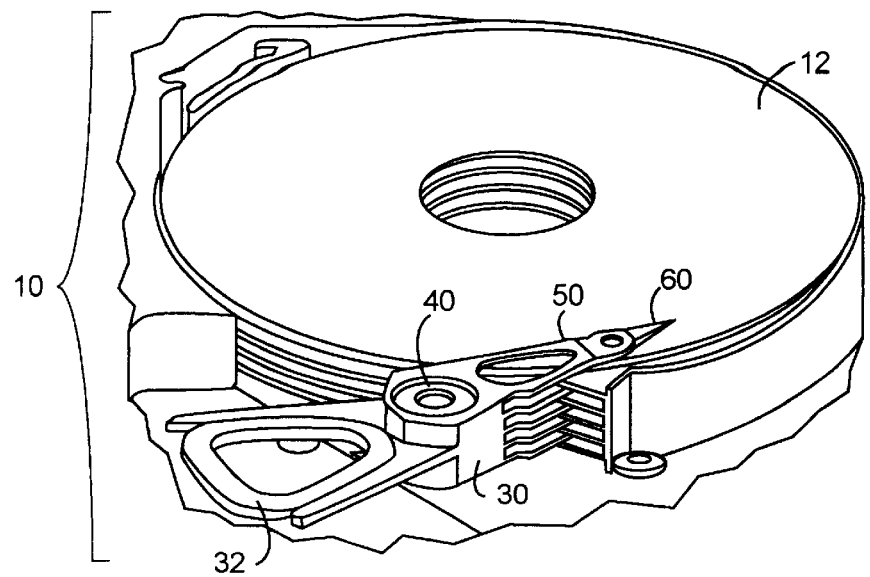
FIG. 1A illustrates a typical prior art high capacity disk drive 10 including actuator arm 30 with voice coil 32, actuator axis 40, suspension or head arms 50–58 with slider/head unit 60 placed among the disks 12.
Figure 1B:
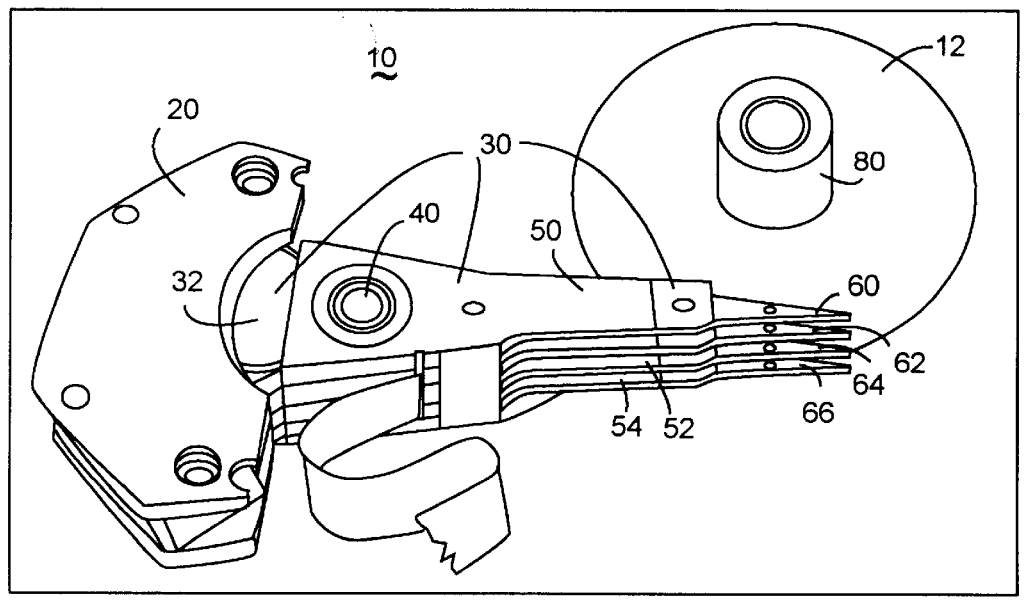
FIG. 1B illustrates a typical prior art high capacity disk drive 10 with actuator 20 including actuator arm 30 with voice coil 32, actuator axis 40, head arms 50-56 and slider/head units 60-66 with all but one disk 12 removed as well as including spindle motor 80.
Figure 2A:
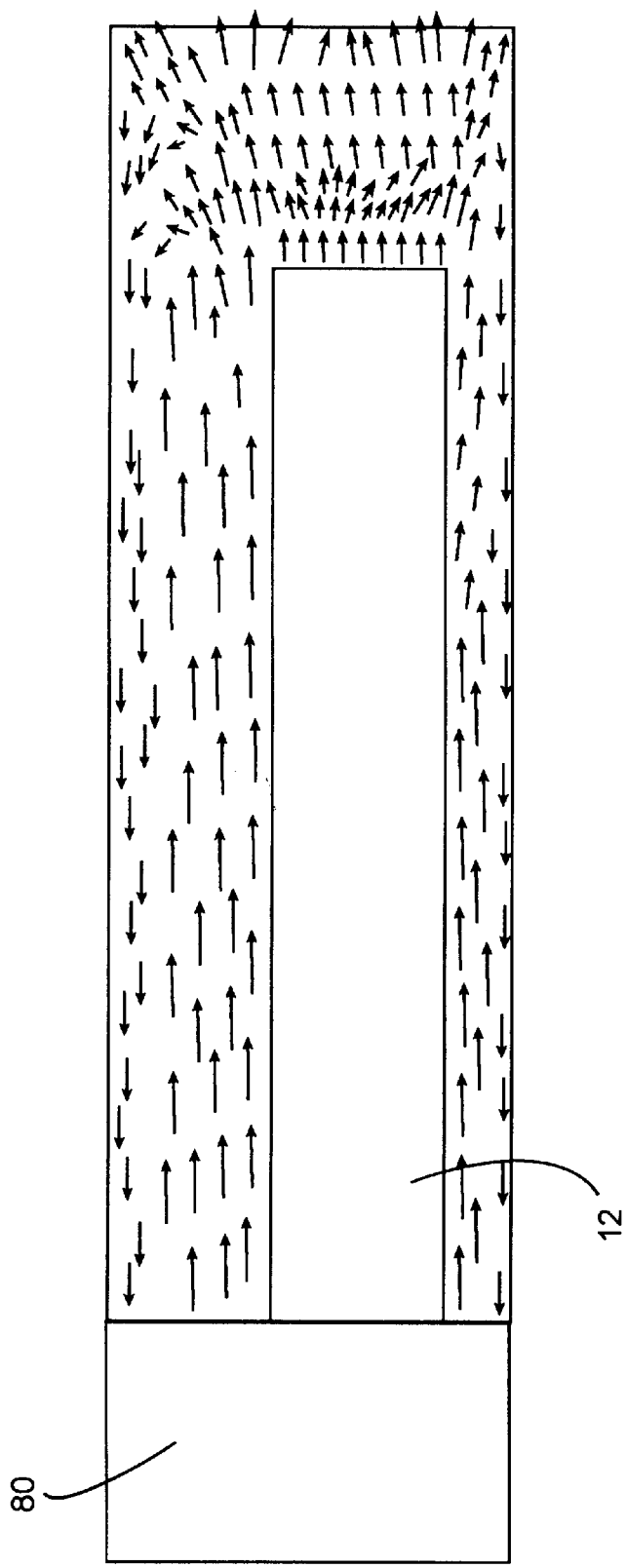
FIG. 2A illustrates a cross section view of spindle motor 80 and one disk 12 with air flow between the upper disk surface 12 and top disk cavity face, as well as air flow between the lower disk surface 12 and bottom disk cavity face.

FIG. 2A illustrates a cross section view of spindle motor 80 and one disk 12 with air flow between the upper disk surface 12 and top disk cavity face, as well as air flow between the lower disk surface 12 and bottom disk cavity face.

A qualitative description of air flow about a disk surface 12 is as follows. Because of the no-slip condition, fluid in contact with the surface rotates with the same angular velocity as the surface and experiences the same centripetal acceleration. At the start of motion, a boundary layer begins to form in the circumferential direction. Fluid in the boundary layer begins to spin but cannot maintain the same centripetal acceleration as the surface. It acquires an outward radial component. As the radial component increases in magnitude, a secondary layer develops in the radial direction with stresses centrally directed. These stresses exert an excitation force on rotating disk leading to the disk fluttering which impairs head-flying over that disk surface.

Figure 2B:
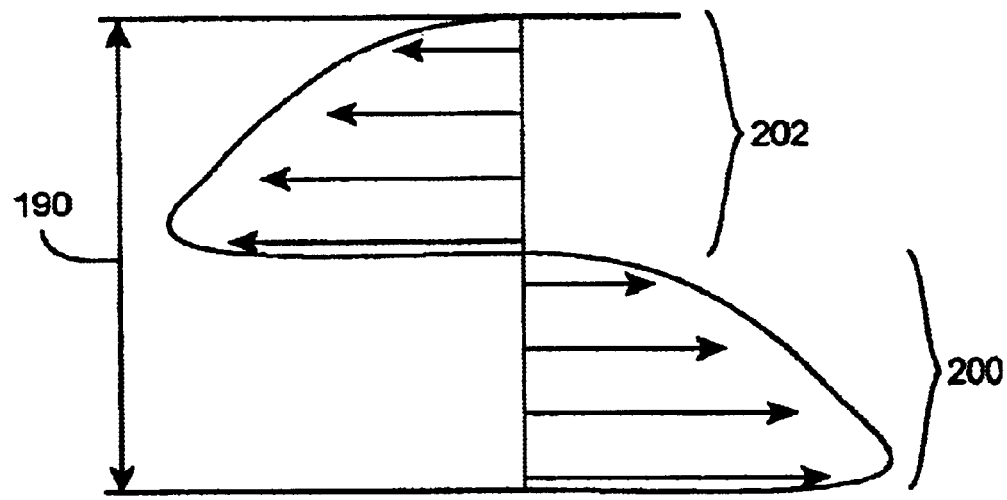
FIG. 2B illustrates the air flow situation between the upper disk surface 12 and top disk cavity face of FIG. 2A showing the formation of two separate boundary layers.

FIG. 2B illustrates the air flow situation between the upper disk surface 12 and top disk cavity face of FIG. 2A showing the formation of two separate boundary layers.

In a conventional hard disk drive, the flow pattern has secondary flows, radially outward near the disk 202 and inward at the housing 200, which dominate the air flow. They are connected by axial flows near the periphery and near the axle. When the gap between 190 disk and cover/base is even larger than that of boundary layer thickness, a significant quantity of fluid in the interior region is essentially isolated from the main flow. It rotates approximately as a rigid body at one-half the angular velocity of the disk. These flow characteristics make large vortex and accelerate disk-tilting effect, which results in a severe Position Error Signal (PES) problem.

It should be noted that in situations involving radial surface motion, the boundary layer is often formulated as proportional to the square root of the viscosity divided by radial velocity in radians per sec.

Table 1 illustrates the boundary layer thickness to Revolutions Per Minute (RPM).

| RPM | Boundary Layer Thickness (mm) |
|---|---|
| 5400 | 0.7 |
| 7200 | 0.55 |
| 10,000 | 0.45 |

FIG. 2B reveals a large vortex over the area of the top disk of a disk stack, which may have just one disk. This vortex provides a mechanical force acting to excite disk fluttering. This is the situation found in all hard disk drives the inventors are aware of.

The inventors found that removing this large vortex in the area of top disk reduces mechanical instability.

Near the rotating disk surface, toward its rim, air flow velocities close nearing 20 meters (m) per second (sec) have been found in simulations based on 5400 RPM. At the edge of the boundary layer, about one boundary layer thickness from the disk surface, air velocity is about 0. Further from the disk surface, a back flow forms due to the friction with the stationary surface.

Figure 2C:
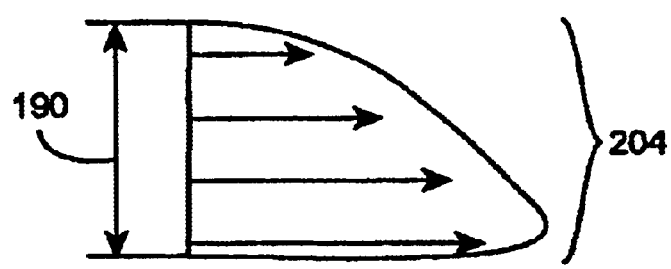
FIG. 2C illustrates the air flow situation between the lower disk surface 12 and bottom disk cavity face of FIG. 2A showing the formation of only one boundary layer.

FIG. 2C illustrates the air flow situation between the lower disk surface 12 and bottom disk cavity face of FIG. 2A showing the formation of only one boundary layer.

By making the gap 190 too narrow for secondary flows to exist as illustrated in FIG. 2C, the fluid adopts a Couette flow pattern 204 with a nearly straight-line, tangential velocity profile between the housing and the disk.

Figure 3:
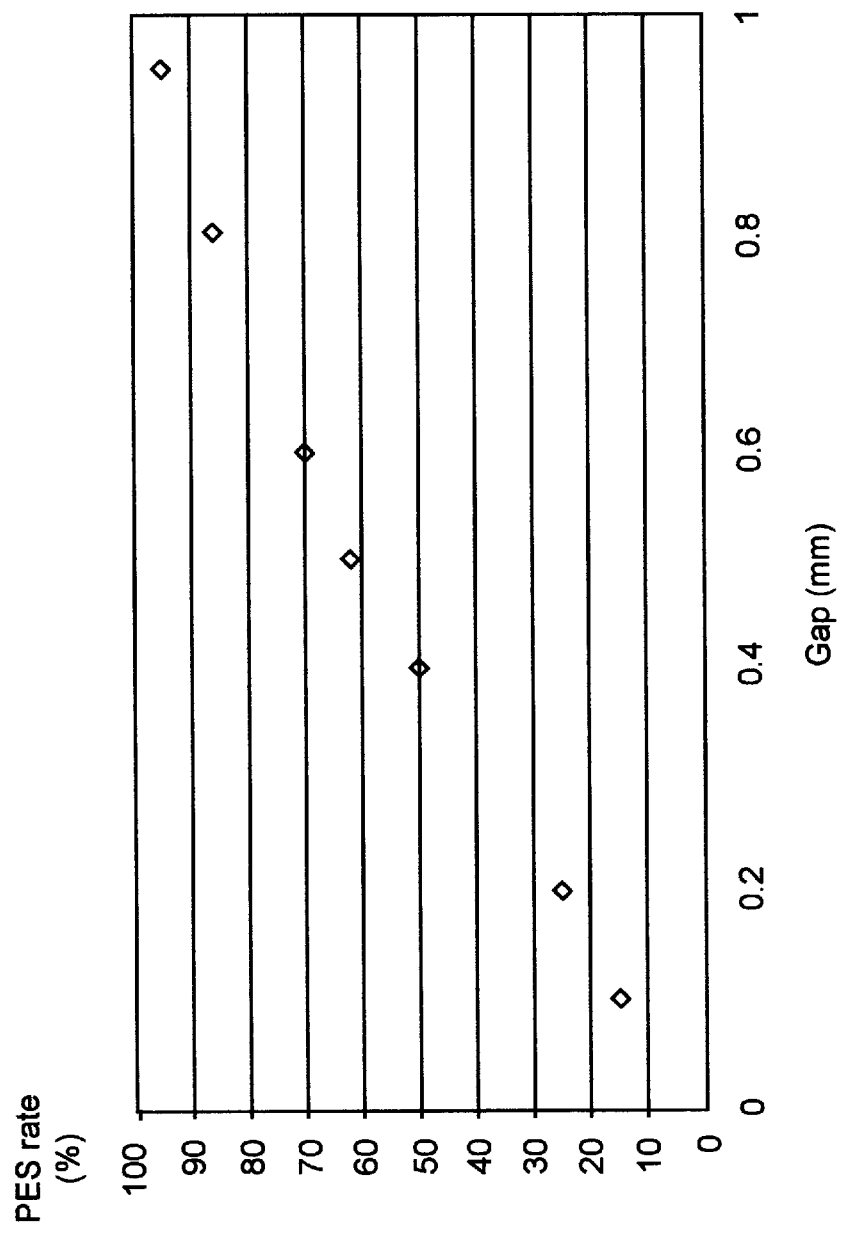
FIG. 3 illustrates the relationship between the gap measured in millimeters along the horizontal axis and head positioning errors as a function of the gap for a disk surface rotating at 5400 RPM.

FIG. 3 illustrates the relationship between the gap measured in millimeters along the horizontal axis and head positioning errors as a function of the gap for a disk surface rotating at 5400 RPM.

The vertical axis is a percentage scale, with 100% being the current head position error rates with contemporary gaps of about 1.2 mm.

When the gap is made less than the boundary layer thickness of 0.7 mm, errors in head positioning are about 75% compared to conventional error rates. Note that when the gap is about 0.4 mm, the head positioning errors are 50% of conventional rates.

FIGS. 4 to 6B illustrate various schematic views a thin disk drive 10 using a single head and supporting various aspects of the invention.

Note that a thin disk drive may be preferred in certain applications, such as multi-media entertainment centers and set-top boxes. Note that the thin disk drive using only a single head may further be preferred, allowing further reduction in the gap between the base 100 and the disk surface 12. The use of a single head in the thin disk drive aids in reducing manufacturing costs and increasing manufacturing reliability.

Figure 4:
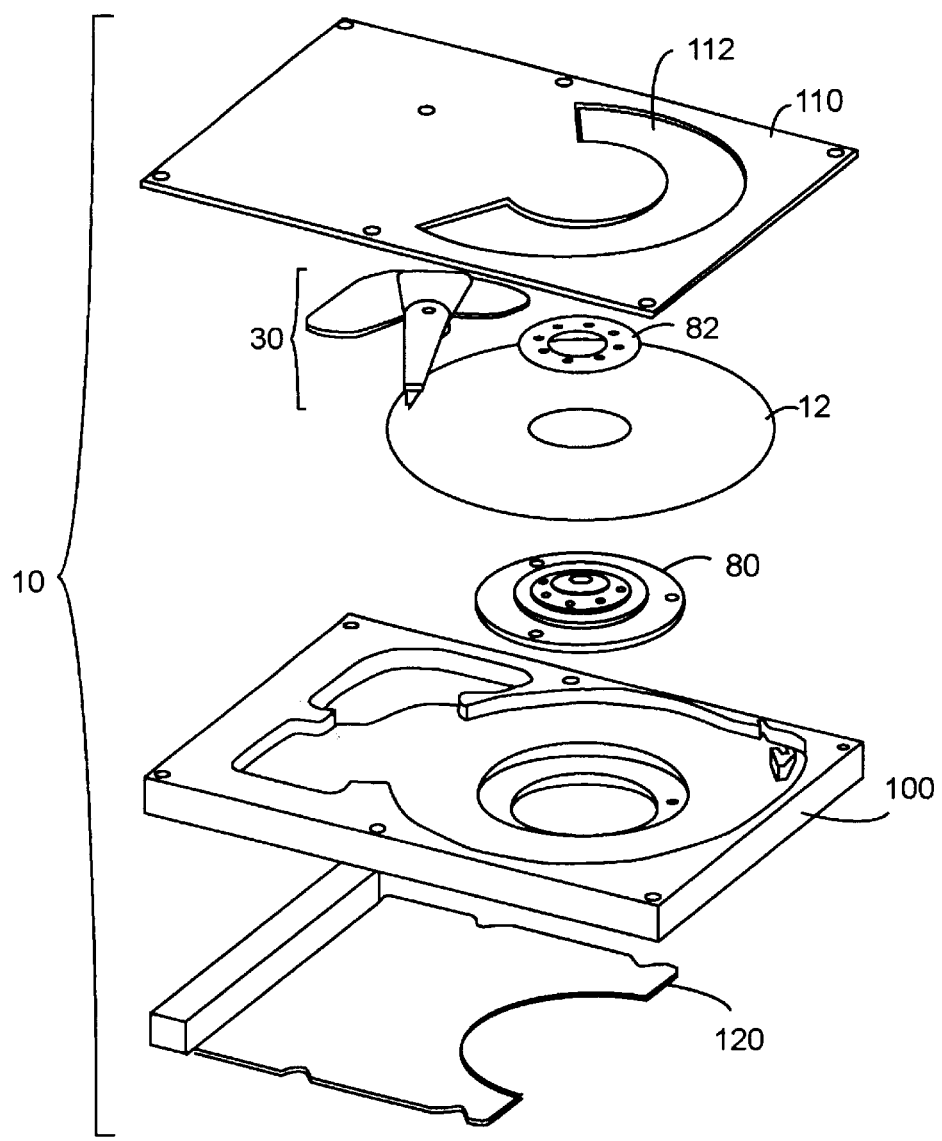
FIG. 4 illustrates an exploded schematic view of a thin disk drive 10 using a single head and supporting various aspects of the invention.

FIG. 4 illustrates an exploded schematic view of a thin disk drive 10 using a single head and supporting various aspects of the invention.

Disk drive 10 includes a printed circuit board assembly 120, a disk drive base 100, a spindle motor 80, a disk 12, a voice coil actuator 30, a disk clamp 82 and a disk drive cover 110. Voice coil actuator 30 may further include a single read-write head on a head/slider 60. Disk drive cover 110 may further include at least one region 112 providing a top stationary surface close to disk 12 upper surface.

Figure 5:
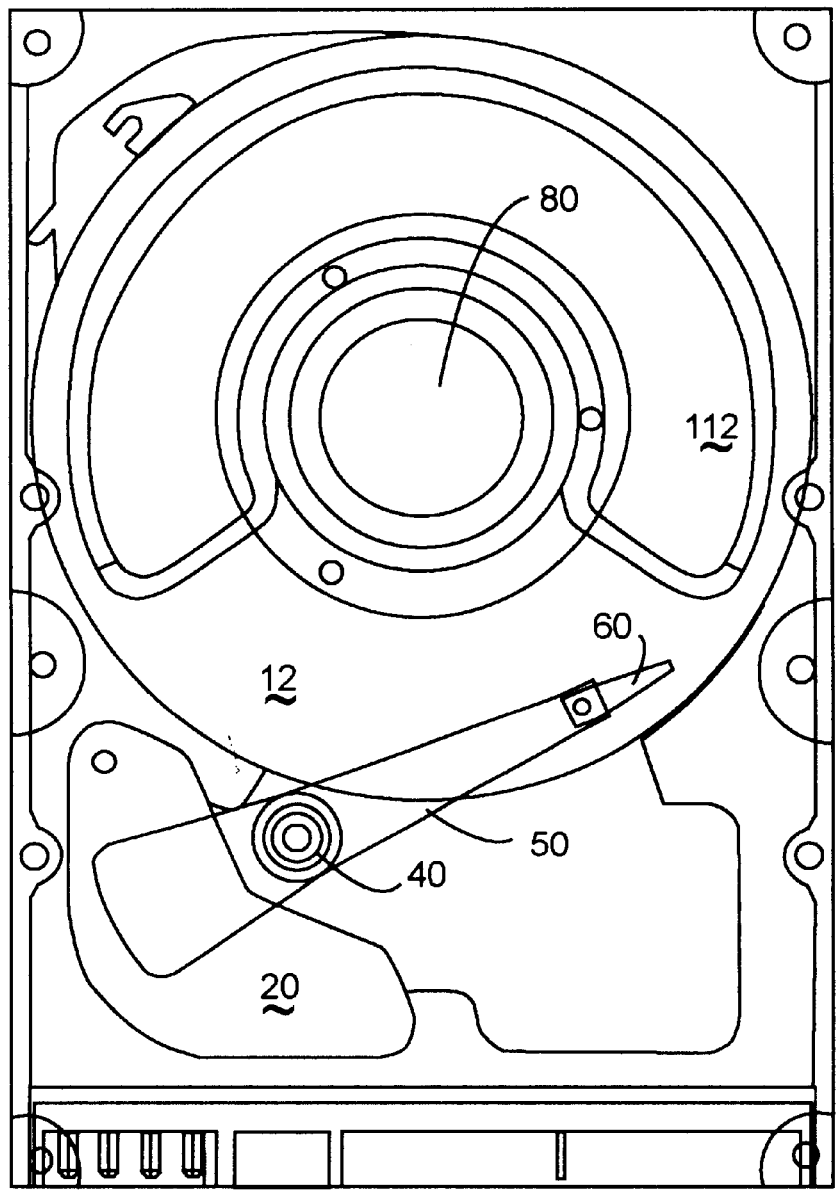
FIG. 5 illustrates a top schematic view of the thin disk drive 10 using the single head as illustrated in FIG. 4.

FIG. 5 illustrates a top schematic view of the thin disk drive 10 using the single head as illustrated in FIG. 4.

Note that region 112 may be essentially outside the region traveled by the actuator arm(s) 50 and head sliders 60 of voice coil actuator 30 when assembled and in normal operation.

FIG. 6A illustrates a perspective view of voice coil actuator components 32, 40, 50, and 60, assembled with respect to the disk drive base 110 as illustrated in FIGS. 4 and 5.

FIG. 6B illustrates a perspective view the assembled disk base 100, spindle motor 80, disk 12, disk clamp 82, and disk drive cover 110, of FIGS. 4 and 5.

The preceding embodiments have been provided by way of example and are not meant to constrain the scope of the following claims.

What is claimed is:

1. A disk drive, comprising:
   a disk drive cover including an top surface separated from an upper disk surface of said disk drive by essentially a first gap; and
   a disk drive base including a bottom surface separated from a lower disk surface of said disk drive by essentially a second gap;
   a disk containing at least one member of a disk surface collection comprising said upper disk surface and said lower disk surface;
   wherein all of said disk surface collection members rotate at an operating rotational velocity;
   wherein rotation of said disk surface collection member at said operating rotational velocity creates a boundary layer thickness from said disk surface collection members, for each of said disk surface collection members; and
   wherein said disk drive cover further includes a second top surface region formed to facilitate the motion of an actuator arm between said disk cover and said upper disk surface;
   wherein said operating rotational velocity is at least 5400 revolutions per minute;
   wherein a member of a gap collection is at most three quarters of said boundary layer thickness;
   wherein said gap collection is comprised of said first gap and said second gap;
   wherein said disk drive has a height of at most 13 millimeters.

2. The apparatus of claim 1,
   wherein said disk drive base further includes a second bottom surface formed to facilitate the motion of an actuator arm between said disk drive base and said lower disk surface.

3. The apparatus of claim 1,
   wherein said operating rotational velocity is at least 7200 revolutions per minute.

4. The apparatus of claim 3,
   wherein said operating rotational velocity is at least 10,000 revolutions per minute.

5. The apparatus of claim 4,
   wherein said operating rotational velocity is at least 14,000 revolutions per minute.

6. The apparatus of claim 1,
   wherein said gap collection member is at most one half of said boundary layer thickness.

7. The apparatus of claim 6,
   wherein said gap collection member is at most one third of said boundary layer thickness.

8. The apparatus of claim 1,
   wherein said disk drive encloses at least two of said disks.

9. The apparatus of claim 1,
   wherein said disk contains each member of said disk surface collection.

10. A media enclosure for a disk drive, comprising:
    a disk drive cover including a top surface separated from an upper disk surface of said disk drive by essentially a first gap; and
    a disk drive base including a bottom surface separated from a lower disk surface of said disk drive by essentially a second gap;
    wherein each member of a disk surface collection rotates at an operating rotational velocity;
    wherein said disk surface collection is comprised of said upper disk surface and said lower disk surface;
    wherein rotation of said disk surface collection member at said operating rotational velocity creates a boundary layer thickness from said disk surface collection member, for each of said disk surface collection members;
    wherein said media enclosure encloses at least one disk of said disk drive when assembled;
    wherein at least one member of a gap collection is at most three quarters of said boundary layer thickness; and
    wherein said gap collection is comprised of said first gap and said second gap.

11. The apparatus of claim 10,
    wherein said disk drive cover further includes a second top surface region formed to facilitate the motion of an actuator arm between said disk cover and said upper disk surface.

12. The apparatus of claim 10,
    wherein said disk drive base further includes a second bottom surface formed to facilitate the motion of an actuator arm between said disk drive base and said lower disk surface.

13. The apparatus of claim 10,
    wherein said operating rotational velocity is at least 5400 revolutions per minute.

14. The apparatus of claim 13,
    wherein said operating rotational velocity is at least 7200 revolutions per minute.

15. The apparatus of claim 14,
    wherein said operating rotational velocity is at least 10,000 revolutions per minute.

16. The apparatus of claim 15,
    wherein said operating rotational velocity is at least 14,000 revolutions per minute.

17. The apparatus of claim 10,
    wherein said gap collection member is at most one half of said boundary layer thickness.

18. The apparatus of claim 17,
    wherein said gap collection member is at most one third of said boundary layer thickness.

19. The apparatus of claim 10,
    wherein said media enclosure encloses exactly one disk of said disk drive.

20. The apparatus of claim 10,
wherein said media enclosure encloses at least two disks of said disk drive.

21. The apparatus of claim 10,
wherein said media enclosure encloses one disk of said disk drive.

22. A method of making a disk drive from said disk drive cover of claim 10 and from said disk drive base of claim 11, comprising the steps of:

using said disk drive cover to assemble said disk drive; and using said disk drive base to assemble said disk drive.

23. Said disk drive, as a product of the process of claim 22.

24. Said disk drive of claim 23,
wherein said disk drive has a height of at most 13 millimeters.

* * * * *